UNITED STATES PATENT OFFICE.

PERCY CARTER BELL, OF METUCHEN, NEW JERSEY.

WHITE ELASTIC COMPOUND.

SPECIFICATION forming part of Letters Patent No. 640,735, dated January 9, 1900.

Application filed May 20, 1899. Serial No. 717,640. (No specimens.)

*To all whom it may concern:*

Be it known that I, PERCY CARTER BELL, a subject of the Queen of England, residing at Metuchen, in the county of Middlesex and State of New Jersey, have invented new and useful Improvements in White Elastic Compounds, of which the following is a specification.

This invention relates to a composition of matter to produce an elastic white material having substantially the characteristics of rubber and being intended to be used as a substitute for rubber in the manufacture of all kinds of goods into which rubber enters in the composition.

My invention comprises a composition whose relative parts and approximate quantities will be described hereinafter, as also the process of compounding to produce the desired result.

The elements contained in my said elastic white compound are vegetable oil, chlorid of sulfur, mineral matter, such as lime and zinc oxid, and bisulfid of carbon.

The quantities in which I employ the aforesaid elements in producing my elastic compound are approximately as follows: vegetable oil, sixty-five parts; chlorid of sulfur, twenty parts; mineral matter, (which may consist of lime five parts and zinc oxid five parts,) ten parts; bisulfid of carbon, five parts.

My process of combining the aforesaid elements in the quantities approximately as stated to derive therefrom the best result in the form of an elastic white mass having substantially the qualities of rubber is as follows: I first place the vegetable oil in a vat and heat it by steam or otherwise to 80° Fahrenheit. I then add to the vegetable oil while at said heat a mixture of the chlorid of sulfur and bisulfid of carbon in the proportions approximately as above stated and which have been previously heated together to a temperature of 60° Fahrenheit. Having added these elements to the vegetable oil, which is at 80°, as aforesaid, I next stir the combined mass thoroughly until it begins to foam. Having reached the foaming condition, it is kept in violent agitation by suitable mechanical means or otherwise until it ceases to increase in volume. This chemical reaction raises the temperature to about 200° Fahrenheit, and before it has time to cool the mass is broken up and the quota of lime and zinc—that is, five parts of each, or ten parts of other suitable mineral matter—is added to the foregoing mass, being properly mixed therewith. This last admixture of the mineral matter renders the whole solid and when cool it is of a brittle nature. Having produced this brittle substance containing the elements before mentioned, I next pulverize it thoroughly between rollers or otherwise to transform it into a powder. This powder I then place upon a clean floor or other surface, spreading it out in a thin layer, and I continually turn the powder to bring every particle thereof in contact with the atmosphere and sunlight, which in time will bleach the whole quantity, by which time the powder is in condition for commercial use.

Having now described my invention, I declare that what I claim is—

1. An elastic white compound consisting of vegetable oil, chlorid of sulfur, mineral matter, and bisulfid of carbon, in suitable proportions united with the aid of heat.

2. An elastic white compound comprising the following elements, in approximately the proportions named, to wit: vegetable oil, sixty-five parts; chlorid of sulfur, twenty parts; mineral matter, such as lime, five parts, and zinc oxid, five parts; and bisulfid of carbon, five parts.

3. A process of uniting the following elements of an elastic white compound, namely, a suitable quota of vegetable oil heated to 80° Fahrenheit, the admixture therewith of chlorid of sulfur and bisulfid of carbon at a temperature of 60° Fahrenheit, stirring the mass until it foams, and keeping it in agitation until the maximum bulk is reached, breaking the mass, adding a quota of mineral matter, whereupon the mass hardens, and then pulverizing and bleaching the resulting product.

In testimony whereof I have hereunto set my hand in the presence of two subscribing witnesses.

P. CARTER BELL.

Witnesses:
   IRVING W. GREENE,
   C. L. BULLOCK.